2,998,299
MANUFACTURE OF LITHIUM PERCHLORATE FROM LITHIUM HYDROXIDE AND AMMONIUM PERCHLORATE

Edward C. Cecil, Trona, David R. Stern, Fullerton, and Glen H. Schafer, Trona, Calif., assignors to American Potash and Chemical Corporation, a corporation of Delaware
No Drawing. Filed June 19, 1957, Ser. No. 666,772
2 Claims. (Cl. 23—85)

This invention relates in general to the manufacture of lithium perchlorate and more particularly to the preparation of a relatively pure anhydrous lithium perchlorate.

Lithium perchlorate is well known to have a high percentage of available oxygen. Furthermore, because of its high density (about 2.5), the oxidizing power of this material per unit volume is very high. Hence, lithium perchlorate is a very desirable ingredient in rocket fuels and elsewhere where strong oxidizing agents are required.

Lithium hydroxide monohydrate and ammonium perchlorate are readily available materials and can be caused to react in water solution in accordance with the equation:

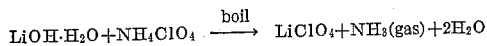

$$\text{LiOH·H}_2\text{O} + \text{NH}_4\text{ClO}_4 \xrightarrow{\text{boil}} \text{LiClO}_4 + \text{NH}_3\text{(gas)} + 2\text{H}_2\text{O}$$

The boiling removes the ammonia, leaving a relatively pure solution of lithium perchlorate. This solution may then be filtered, if desired, to remove any insoluble impurities. The hot pregnant liquor is then cooled to crystallize a crop of lithium perchlorate trihydrate. This compound may be readily recovered by filtration while the mother liquor can be recycled in the process. Mother liquor may also be bled from the system to remove soluble impurities.

It is advantageous to use ammonium perchlorate since with this compound it is not necessary to remove a second component from the system as a solid salt by evaporation and crystallization. In a similar manner, of course, perchloric acid meets this requirement. Any other metallic perchlorate would require the removal of a metallic hydroxide.

One difficulty with the process as outlined above is that, where anhydrous lithium perchlorate is desired, some means of dehydrating the trihydrate must be employed. When lithium perchlorate trihydrate is dried in conventional drying equipment, a hard, caked, difficult-to-grind material is produced. This is due to the fact that when heated to a relatively low temperature, 95° C., lithium perchlorate trihydrate melts in its water of crystallization. By contrast, the monohydrate does not melt until a temperature of 150° C. is reached.

It is therefore an object of this invention to provide a method for the preparation of relatively pure lithium perchlorate.

A further object of this invention is to provide a method for the preparation of anhydrous lithium perchlorate wherein the drying is carried out under conditions such that a free flowing material is secured.

Other objects and advantages of this invention, if not specifically set out, will become apparent during the course of the discussion below.

Broadly, it has been found that lithium hydroxide and ammonium perchlorate may be reacted in accordance with the equation set forth above whereby to produce a relatively pure lithium perchlorate which, under limited conditions of drying, as set forth below, may be purified to the extent that various soluble and insoluble impurities are removed therefrom together with the ammonia formed by the reaction. Further, the water of hydration may be removed from the lithium perchlorate without the production of the undesirable caked material. The drying is accomplished by one of two expedients. The lithium perchlorate trihydrate formed by the above reaction may be dried at less than about 95° C. under 0 mm. Hg to 100 mm. Hg pressure and preferably at about 90° C. under 15 mm. Hg pressure, whereby to produce lithium perchlorate monohydrate. This material is thereafter heated to a temperature of no greater than about 150° C. under 0 mm. Hg to 100 mm. Hg and preferably 140° C. and 15 mm. Hg to convert the monohydrate to the anhydrous lithium perchlorate.

Alternatively, the trihydrate form of the lithium perchlorate is agitated during the drying operation at a temperature of 150° to 235° C. and preferably 160° C. to 180° C. The agitation prevents the formation of the caked material and any organics in the lithium perchlorate are volatilized at the relatively high temperatures employed. Where the alternative drying procedure set forth here is used, the intermediate step whereby the trihydrate is recovered is unnecessary. No caking of the trihydrate at 95° C., its melting point, is possible. Further the alternative drying procedure enables another improvement in the process in that the solid lithium hydroxide monohydrate and the ammonium perchlorate can be reacted directly in the drying zone, the two mols of water formed per mol of lithium perchlorate providing a milieu in which the reaction takes place. Also, the lithium perchlorate monohydrate melts in its water of crystallization at 150° C. so that if the temperature of the reaction-drying zone is adjusted to 150° C. at the outset, the necessary aqueous phase is formed without the addition of extra water.

More particularly, it has been found that lithium perchlorate may be formed by reacting lithium hydroxide monohydrate with ammonium perchlorate in aqueous phase and heating the product so formed to a temperature sufficient to drive off as a gas the ammonia formed and thereafter drying the lithium perchlorate product so formed. Where the product is to be dried without agitation, it is preferred to filter the solution formed by the reaction to remove any insoluble impurities. The hot pregnant liquor is then cooled to crystallize a crop of lithium perchlorate trihydrate. This compound is recovered by filtration while the mother liquor is preferably recycled in the process. The mother liquor may also be bled from the system to remove soluble impurities. Lithium perchlorate, while in the trihydrate form, melts in its water of crystallization at 95° C. while the monohydrate melts at 150° C. The undesirable melting of the trihydrate and the formation of the hard, caked, difficult-to-grind material is avoided by first dehydrating the trihydrate to the monohydrate form at somewhat less than 95° C. under sufficient vacuum to allow for the volatilization of the water present. A pressure of 100 mm. Hg is a maximum for use where drying time is immaterial. Temperatures of as low as 75° C. may be employed where pressures on the order of 5 mm. Hg are employed. About 16 hours are required under these conditions. Pressures approching 0 mm. Hg are desired but are not readily attained in commercial operations. A preferred set of conditions is 90° C. under 15 mm. Hg absolute pressure for a period of about four hours. The length of time necessary to produce the monohydrate may be easily ascertained by withdrawing a sample and ascertaining the condition of the free-flowing powder. Generally, a time of 6 hours to 24 hours is necessary. After the formation of the monohydrate, the temperature may be raised to in excess of 95° C. as the monohydrate does not begin to melt until a temperature of 150° C. is reached. Therefore, temperatures approaching this maximum may be used. A preferred temperature is 140° C. and a preferred time at this temperature is 16 hours. Where lesser temperatures are used, longer drying periods are necessary. The lithium perchlorate monohydrate is thus converted to the lithium perchlorate in the anhydrous form which is friable, free-flowing and easily ground.

Where the alternative method of drying involving agitation is employed, a suitable and recommended apparatus is a steam-jacketed pugmill. High temperatures may be used here, 160° C.–180° C. being preferred. A maximum temperature for use under conditions where agitation is provided is 235° C. and a minimum is 150° C. at atmospheric pressure. Where atmospheric pressure is used at a temperature of 160° C.–180° C., the lithium perchlorate trihydrate may be dehydrated to the monohydrate form in a period of about six hours under atmospheric pressure or in somewhat lesser periods under a vacuum. Very short drying times at the higher temperatures are possible as the action of the blades or paddles of the pugmill (moving from one-half foot to several feet per second) is such as to preclude the formation of the caked product. Also, where the preferred pugmill temperatures are employed, 160° C.–180° C., any organics in the lithium perchlorate are removed by volatilization.

The lithium perchlorate produced by vacuum drying has somewhat different physical properties than does the lithium perchlorate produced by drying in an agitation chamber. For example, the density of the vacuum-dried material is 2.7 as against 2.8 for the pugmill-dried lithium perchlorate.

Additional advantages flow from the use of an agitation chamber such as a pugmill and temperatures in excess of 150° C. (the transition point of monohydrate to anhydrous). It is possible to simply charge the pugmill with reaction liquor without recovery of the trihydrate. Also, solid lithium hydroxide monohydrate and ammonium perchlorate can be directly reacted in the pugmil to produce 2 mols of water per mol of lithium perchlorate wherever a somewhat off-color material is satisfactory as a product. As the lithium perchlorate monohydrate melts in its water of crystallization at 150° C., solid lithium hydroxide monohydrate and ammonium perchlorate can be caused to react directly in the aqueous phase, provided that the pugmill temperature is adjusted to at least 150° C.

Since 1% to 2% free moisture is usually present in the material to be crystallized, limited drying immediately following the reaction is necessary. An hour or so at the preferred pugmill temperature, 160° C.–180° C. is sufficient. If desired, the lithium perchlorate could also be vacuum dried to remove free water at 140° C. under 15 mm. Hg. However, it is easiest to simply continue the heating without removing the lithium perchlorate from the pugmill wherein the reaction has taken place— in which event drawing of a vacuum is not always convenient.

Examples of the process of this invention are set forth below by way of illustration.

EXAMPLE I

Lithium hydroxide monohydrate, LiOH·H₂O in the amount of 393 pounds and 12.5 pounds of water, the water thus representing about 3% of the total, were charged into a reaction tank containing 884 additional pounds of water. Ammonium perchlorate feed in the amount of 1,100 pounds was run into the tank. The reaction was allowed to proceed for 2 to 3 hours, during which time the temperature was gradually raised to the boiling point so as to drive off the ammonia formed. A total of 420 pounds of water and 150 pounds NH₃ were driven off during the boiling, which was allowed to proceed for an additional hour.

Lithium perchlorate trihydrate containing traces of unreacted lithium hydroxide (850 pounds total weight) was then filtered to remove the insoluble materials. The filtrate consisted of the aforementioned quantities of lithium perchlorate and lithium hydroxide together with 740 pounds of water. This filtrate was then passed into a crystallizer operated at a temperature of 104° C. and an additional 235 pounds of water evaporated. Next was charged into the crystallizer an additional 4000 pounds of a solution containing 1700 pounds lithium perchlorate and about 20 pounds lithium hydroxide which represented the solution remaining from a prior crystallization operation. This formed a total of 5300 pounds of material in the crystallizer, including 2500 pounds lithium perchlorate and 21 pounds lithium hydroxide. After completion of the crystallization step and filtration, a filter cake containing 1310 pounds of solid lithium perchlorate trihydrate was obtained. In addition, some 40 pounds of water remained in which were dissolved 30 pounds lithium perchlorate and 0.35 pounds LiOH. A portion of the trihydrate was vacuum dried at a pressure of 15 mm. Hg at 90° C. for a period of four hours. A free-flowing crystalline lithium perchlorate monohydrate was formed which was then further heated at the same pressure to a temperature of 140° C. and held at this temperature for a period of 16 additional hours. In this fashion the monohydrate was converted to the anhydrous lithium perchlorate which is in the form of a free-flowing, easily ground substance.

EXAMPLE II

Another portion of the filter cake prepred above was charged into a steam-jacketed pugmill which was then regulated to a temperature of 170° C. The dehydration of lithium perchlorate trihydrate was obtained after a period of 6 hours at atmospheric pressure. Throughout the time that the drying was under way, the paddles of the pugmill continued rotating to break up the caked material which had a tendency to form. The density of the pugmill-dried lithium perchlorate was found to be 2.8. The crystalline structure of the pugmill-dried material was also found to be slightly different from that of the lithium perchlorate produced in the vacuum dried procedure.

EXAMPLE III

The example which follows shows production of a 100 pound batch of lithium perchlorate.

68 pounds of lithium hydroxide monohydrate containing 4% water and 185 pounds of ammonium perchlorate containing 1% water were added to 272 pounds of water in a reaction vessel. After filtering out one-half pound of insoluble impurities, the 525 pounds of solution were evaporated until 188 pounds of water and 27 pounds of ammonia had been removed. The concentrated liquor (310 pounds) was cooled and about 155 pounds of lithium perchlorate trihydrate (containing about 4% free moisture) were recovered on a centrifuge. The filtrate from the foregoing operation (154 pounds) was stored for use in the next cycle. The 155 pounds of trihydrate were then converted to about 90 pounds of product in the pugmill operated at 170° C. for 6 hours with blades traveling .8 to 1.2 feet/sec. There was a 10% handling loss.

EXAMPLE IV

In the next example, the reaction between solid lithium hydroxide and solid ammonium perchlorate is shown.

About 15 pounds of lithium hydroxide monohydrate (containing 0.5 pounds of free water) and 44 pounds of ammonium perchlorate were charged into a pugmill. The pugmill was then heated to around 170° C. The raw materials reacted and dissolved in the water generated. After around 5 hours drying time, dehydration was essentially complete and 40 pounds of an anhydrous free-flowing product (H₂O less than 0.2%) was withdrawn.

The following example shows the use of perchloric acid in the process.

Example V

About 127 pounds of 60% perchloric acid were added cautiously to around 150 pounds of an aqueous solution containing the equivalent of 31.5 pounds of lithium hydroxide monohydrate. The resulting hot solution of lithium perchlorate was filtered, to remove a light amount of insolubles, and concentrated until about 130 pounds of water had been evaporated. The hot concentrated solution was then transferred to a pugmill where it was dehydrated at around 180° C. for 8 hours. About 75 pounds of anhydrous lithium perchlorate were recovered.

It is seen, therefore, that through the practice of this invention it is possible to produce lithium perchlorate using readily available materials, the lithium perchlorate in the preferred embodiment being in the anhydrous form, free-flowing, friable and easily ground.

Obviously, many modifications and variations of this invention as hereinbefore set forth may be made without departing from the spirit and scope thereof, and therefore only such limitations should be imposed as are indicated in the appended claims.

We claim:

1. A process for preparation of lithium perchlorate comprising heating an aqueous solution of lithium hydroxide and ammonium perchlorate to form lithium perchlorate and volatilize ammonia, continuing the heating until the solution is free of ammonia, and then recovering lithium perchlorate from the solution.

2. A process for the preparation of anhydrous lithium perchlorate which comprises: reacting solid lithium hydroxide monohydrate and ammonium perchlorate at a temperature of at least about 150° C. and less than 235° C. whereby to produce lithium perchlorate and water in a mol ratio of 1:2; and thereafter continuing to heat the reaction product so formed at a temperature in excess of about 150° C. and less than about 235° C. whereby to volatilize the ammonia so formed together with the water of hydration of said lithium perchlorate.

References Cited in the file of this patent

UNITED STATES PATENTS

| | | |
|---|---|---|
| 1,738,930 | Smith | Dec. 10, 1929 |
| 1,824,101 | Smith | Sept. 22, 1931 |
| 2,776,205 | La Lande et al. | Jan. 1, 1957 |

FOREIGN PATENTS

| | | |
|---|---|---|
| 523,798 | Germany | Apr. 28, 1931 |

OTHER REFERENCES

Mellor: "Comprehensive Treatise on Inorg. and Theo. Chem.," vol. 2, p. 397, Longmans, Green and Co., N.Y., 1922., vol. II, p. 395.

Perry: "Chemical Engineer's Handbook," 3rd ed., page 857, pub. by McGraw-Hill Book Co., Inc. N.Y., 1950.